United States Patent [19]

Creim

[11] Patent Number: 4,469,341
[45] Date of Patent: Sep. 4, 1984

[54] ARTICLE RACK AND CART ASSEMBLY

[75] Inventor: James M. Creim, Nashville, Tenn.

[73] Assignee: Cumberland Valley Metals, Inc., Nashville, Tenn.

[21] Appl. No.: 328,429

[22] Filed: Dec. 7, 1981

[51] Int. Cl.³ .............................................. B62B 1/16
[52] U.S. Cl. ............................... 280/47.26; 211/60 R; 280/47.28; D34/26
[58] Field of Search ............ 211/49 R, 60 R; D34/24, D34/26; D23/138; 280/47.28, 47.29, 47.24, 47.26, 43.12, 47.13 R, 47.34, 47.17, 47.18, 47.19, 63, 30; 126/298; 414/446

[56] References Cited

U.S. PATENT DOCUMENTS

| D. 173,484 | 11/1954 | Haynes | D34/24 |
| D. 174,321 | 3/1955 | Haynes | D34/24 |
| D. 184,752 | 3/1959 | McVey | 126/298 X |
| D. 266,368 | 9/1982 | Flanders | D34/26 |
| 1,934,289 | 11/1933 | White | 280/47.28 X |

OTHER PUBLICATIONS

New Hampton General Store, Spring 1980, Catalog, p. 41, Log Tram, Item F, center of page.

Primary Examiner—Joseph F. Peters, Jr.
Assistant Examiner—Michael Mar
Attorney, Agent, or Firm—Mason, Fenwick & Lawrence

[57] ABSTRACT

An article rack and cart assembly comprising an article rack and a cart having a pair of upright members interconnected by at least a handle member and including a pair of wheels mounted for rotation at a bottom portion of the cart, and a pair of arms extending therefrom in substantially parallel relationship with each other. The rack is uniquely adapted to be detachably coupled to the cart and comprises a pair of U-shaped support members, a pair of support legs and an article support surface configured in a U-shape to receive the articles. The support legs are disposed substantially parallel with each other and spaced a distance apart to receive therebetween the arms of the cart, whereby the corresponding legs and arms extend in close contact with each other, to ensure the rack's stability, when engaged with and carried by the cart.

1 Claim, 5 Drawing Figures

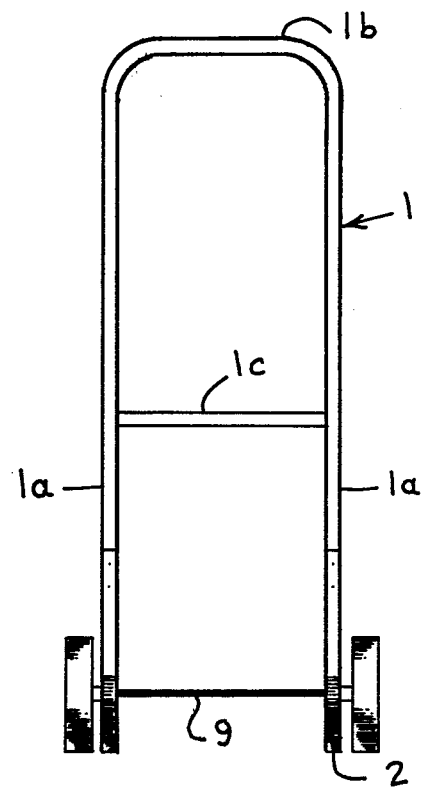
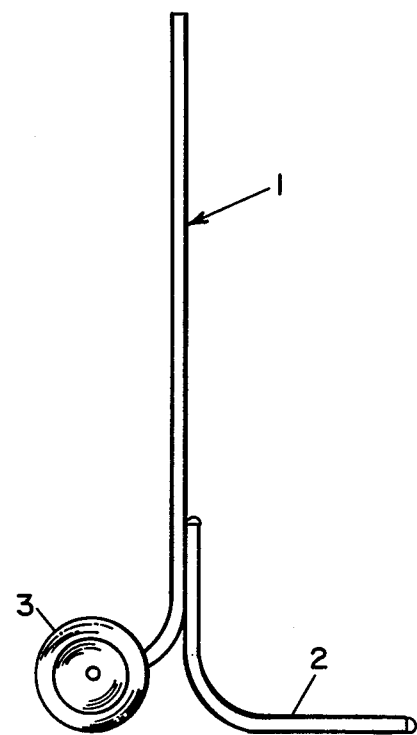
FIG.1A　　　　FIG.1B
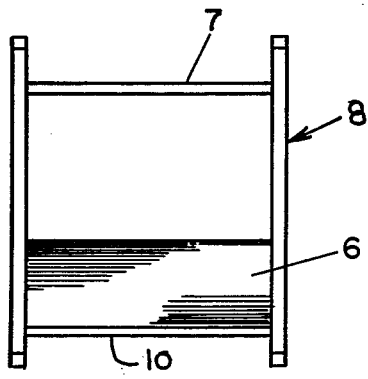
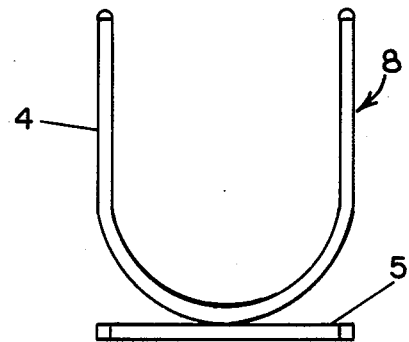
FIG.2A　　　　FIG.2B

ARTICLE RACK AND CART ASSEMBLY

BACKGROUND OF THE INVENTION

Description of the Prior Art

This invention, relates to an assembly comprised of an article rack and cart adapted to engage and disengage each other, whereby the cart may be used, when engaged with the article rack, to transport the rack loaded with articles such as logs, from one position to another.

Articles such as logs are heavy and cumbersome to carry from a storage bin to their place of use, e.g. a fireplace. The prior art such as illustrated by U.S. Pat. No. 3,021,011 has employed portable racks including a plurality of wheels, enabling a user to transport a bundle of articles, e.g. logs, to a fireplace by merely pushing the rack with a minimum of physical effort. In a similar design, the assignee of this invention has produced a rack and log cart known as "The Hearthside Hauler" employing a rack for carrying logs, the rack being permanently coupled to a set of wheels. In addition, "The Hearthside Hauler" provides means of detachably connecting a handle to the article rack, whereby the handle may be grasped by a person in an upright position to move the rack from one position to another. A disadvantage of this rack and cart assembly is that the wheels are permanently attached to the rack, thereby detracting from the asthetic appearance of the rack when detached from the handle.

To improve the appearance of an article rack and cart assembly, the N.A. Taylor Manufacturing Company has suggested the use of an assembly comprising a cart having an upright handle and a set of wheels for engaging and lifting a rack for carrying articles. The cart includes an upper hook for engaging a horizontally disposed member of the article rack and a set of forks for engaging a lower portion of the rack. It is apparent that the user must accurately engage the forks to the lower portion of the rack in order that the rack and its contents of articles may be lifted and moved. In a similar manner, Flanders Industries has provided a rack and cart assembly comprising a cart with an upright handle having at its lower extremity a pair of wheels and a set of arms for engaging the article rack. The article rack includes a pair of hollow leg members, for receiving therein corresponding of the rack's arms, whereby the cart and rack are assembled together for transport. In order to stabalize the rack while it is being carried, it is necessary to provide a brace extending horizontally of the floor surface and a clip attached to the brace for further connecting the cart and the rack, so that the rack and the articles, e.g. logs, do not tip forward as they are lifted. Thus the connection of the cart and rack requires two steps. First, the insertion of the arms into the hollow legs and and the further step of securing the clip to the rack; upon reaching the distination, a similar but reverse process of decoupling the rack and cart takes place. Continued use of such a rack and cart assembly produces a strain upon the cart and the rack tending to deform the hollow leg members and their interconnection to the remainder of the rack, as well as the cart's arms. A further difficulty with such a rack and cart assembly is the relative instability of the rack and its contents, e.g. heavy wooden logs, while in transport.

SUMMARY OF THE INVENTION

It is therefore the object of this invention to provide a new and improved article rack and cart, which are detachably coupled to each other in a manner that provides for stabiltiy of support when the rack and cart are assembled for transport of the articles.

It is a further object of this invention to enhance the structural integrity of an article rack and cart assembly in order to enhance the life expectancy of the assembly under duress and hard use.

It is a still further object of this invention to provide a new and improved cart and log rack assembly of increased structural integrity and improved rack stability when engaged with the cart for transport of the logs.

In accordance with these and other objects of this invention, there is disclosed an article rack comprising a rack having a pair of upright members interconnected by at least a handle member and including a pair of wheels mounted for rotation at a bottom portion of the cart, and a pair of arms extending in cantilever fashion from the bottom portion of the cart in substantially parallel relationship with each other. The rack is uniquely adapted to be detachably coupled to the cart and comprises a pair of U-shaped support members, each connected to one of a pair of suport legs at its bite portion. A pair of support bars extends between and interconnects the U-shape support members. An article support surface, likewise configured in a U-shape, extends between the support members to receive the articles and in particular wooden logs. The support legs are disposed substantially parallel with each other and spaced a distance apart to receive therebetween the arms of the cart, whereby the corresponding legs and arms extend in close contact with each other over a significant portion of their length to ensure the rack's stability, when engaged with and carried by the cart. In addition, one of the rack's support bars, as well as the article support surface, are adapted to engage the upright members and the arms of the cart to further ensure the rack's stablility, i.e. to prevent the rack from tilting forward or laterally as it is being carried by the cart. Further, the manipulation of the cart to engage the rack is simplified by the support legs of the articles rack, in that the user simply grasps the handle member of the cart and pushes forward whereby the rack's arms engage the support legs, thus guiding the cart into a secure and stable coupling relationship with the article rack.

BRIEF DESCRIPTION OF THE DRAWINGS

A detailed description of a preferred embodiment of this invention is hereafter made with specific reference being made to the drawings in which:

FIGS. 1A and 1B are respectively front and side views of the cart of the assembly of this invention;

FIGS 2A and 2B are respectively front and side views of the rack of the assembly of this invention.

DESCRIPTION OF THE PREFERRED EMBODIMENT

Figure 3:
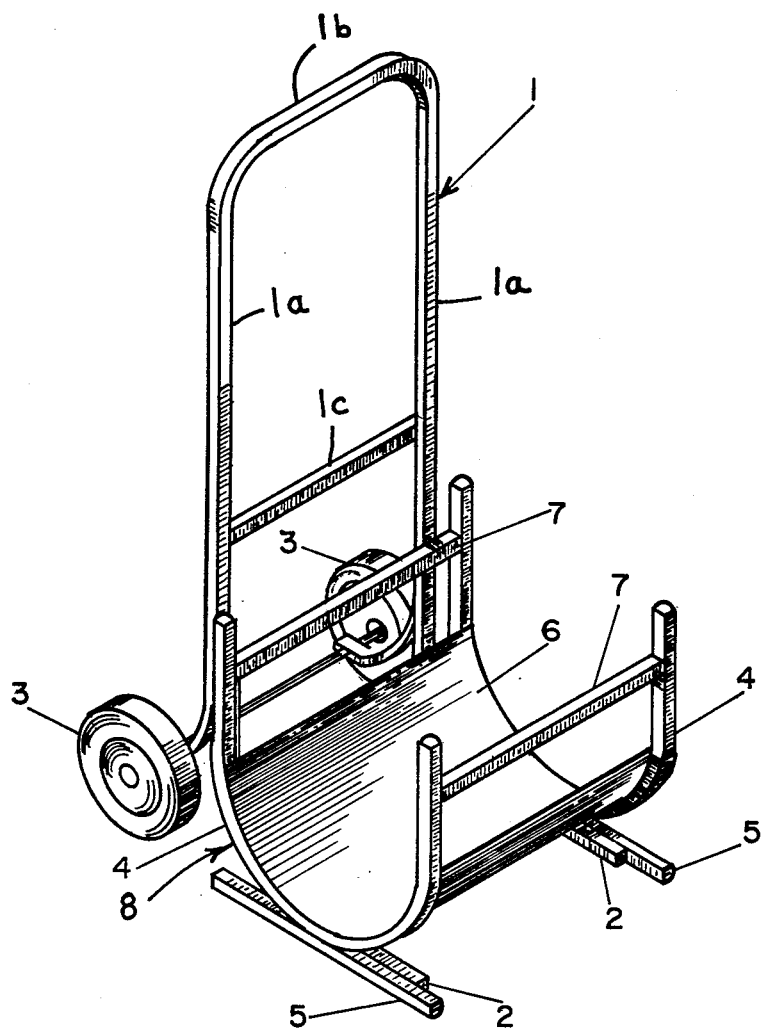
FIG. 3 is a perspective view of the article rack as shown in FIGS. 2A and 2B as coupled to the cart as shown in FIGS. 1A and 1B, in a manner to permit the cart to transport the rack and its articles.

Referring now to the drawings and in particular to FIG. 1A and 1B, there is shown a cart 1 comprised of a pair of upright members 1a disposed substantially parallel with each other integrally connected to a handle member 1b disposed therebetween at a top most portion of the cart, in a manner to be readily graspable by a user. A brace member 1c is disposed between and connected to the upright members 1a by suitable means such as welding or bolting, as are well known in the art, to provide structural integrity to the cart construction. As particularly shown in FIG. 1B, a lower portion of each of the upright members 1a is curved away from the plane defined by the upper portions of the upright members 1a to permit a pair of wheels 3 to be mounted upon the cart 1. As shown in FIG. 1A, an axle 9 extends between and is inserted through an opening within the lower portions of each of the upright members 1a so that te wheels 3 may be rotatably attached thereto.

As shown in FIGS. 2A and B, the rack 8 is particularly adapted to receive a plurality of articles such as wooden logs (not shown) and comprises a pair of U-shaped support members 4 that are disposed substantially parallel to each other. Each of the U-shaped support members 4 includes a bight portion and leg portions extending in substantially upright, vertical positions, i.e. the leg portions are substantially parallel with each other and vertically disposed with respect to the floor surface upon which the rack 8 rests. A pair of support bars 7 is disposed between and connected to the U-shaped support members 4 by a suitable techique such as welding. An article support surface 6 is shaped in a curved fashion matching the configuration of the bight portion of each of the U-shaped members 4 and is secured to these bite portions in any well known manner, whereby a surface is provided to receive the articles and in particular, a plurality of wooded logs. As shown in FIG. 2A, a reinforcing member 10 is disposed at the bottom most portion of the surface 6 in a manner to extend between the U-shaped support members 4 to provide additional strength to the support surface 6 as well as to provide a surface against which the arms 2 of the cart 1 abut in a manner so as not to deform the article support surface 6.

FIG. 3 shows the manner in which the cart 1 engages the article rack 8 to permit the rack to be transported in a secure stable relationship with respect to cart 1. In particular, the support legs 5 of the rack 8 are disposed in a substantially parallel relationship with each other and are spaced a distance apart selected to permit the arms 2 of the cart 1 to be guided and directed between the support legs 5. When the cart 1 and in particular its legs 2 have been fully inserted between the support legs 5, there exists a substantial length of contact between the arms 2 and legs 5 to ensure the lateral stabiltiy of the rack 8 as it is being transported by the cart 1. In addition, the rearward most support bar 7 is engaged with the upright members 1a and the support surface 6 engages the curved interconnecting portion of the arms 2, to further support the rack 8 with respect to the cart 1. Once so coupled, the operator grasps the handle 1b pulling it toward him to rotate the cart 1 in a counterclock wise direction as shown in FIG. 3, thus lifting the rack 8 and the articles carried thereby. While in transport, the engagement of the arms 2 and the support legs 5, as well as the additional contacts between the support bar 7 and the support surface 6, and the upright members 1a provide a stable interconnection between the cart 1 and the rack 8. Upon being rotated to its rack carrying position, the arms 2 of the rack 8 engage the reinforcing number 10 as shown in FIG. 2A. Upon reaching the place of use, the assembly is brought to a halt and the cart 1 is rotated in a forward or clockwise direction as shown in FIG. 3, whereby the cart 1 may be removed from engagement with the rack 8 by simply withdrawing the arms 2 of the cart 1 from between the support legs 5. Again, the support legs 5 provide a guiding surface for the withdrawal of the arms 2. Upon disengagement, the rack 8 stands alone and is without wheels thus providing a pleasing asthetic appearance.

In an illustrative embodiment of this invention, the various portions of the cart 1 and rack 8 are made of a metallic material such as steel, and may be configured rectangularly.

As shown particularly in FIG. 1, the cart 1 of this invention may be used independantly of the rack 8, to transport other objects, e.g. trash containers.

Thus, there has been shown a new and improved article rack and cart assembly which ensures ready engagement and disengagement of the cart and rack. When engaged together, the rack and cart are in a stable relationship due to the engagement of the rack's support legs to the cart's arms and of the rack's article support and surface and support bar with respect to the upright members of the cart. Further, by so simplifying the interconnection of the cart and rack, its structural, integrity is ensured so that after prolonged use, the cart's arms, as well as the rack's support legs, will still maintain their shape and not be deformed.

In considering this invention, it should be remembered that the present disclosure is illustrative only and the scope of the invention should be determined by the appended claims.

I claim:

1. An article rack and cart assembly adapted to receive and carry articles, said assembly comprising:
    (a) a cart having a pair of upright members, each upright member including an upper and a lower portion, a handle member interconnecting said upper portions of said upright members, a pair of wheels rotatably secured to respective of said lower portions of said upright members, and a pair of arms extending from said lower portions of said upright members respectively in a substantially parallel relationship to each other; and
    (b) an article rack adapted to be detachably coupled to said cart and having a pair of U-shaped support members, an article support surface of a configuration and disposed between said support members to receive the articles, and a pair of support legs each secured to a bight portion of its U-shaped support member, said support legs disposed in a substantially parallel relationship with and spaced a distance from each other to facilitate the guiding of said arms therebetween as said cart is coupled with said article rack and, upon assembly together, ensure substantial contact between said respective legs and arms to ensure the stability of said rack as it is transported by said cart, each of said arms of said cart has a curved surface of substantially the same configuration as that of said article support surface, whereby upon coupling of said cart and said rack, said article support surface engages in intimate fashion said curved portions of said arms.

* * * * *